July 7, 1964

E. C. MARTIN ETAL 3,140,256

SEPARATION PROCESS

Filed Sept. 30, 1957

INVENTORS:
Eugene C. Martin
Robert C. Binning
Leon M. Adams
Robert J. Lee

BY Joseph C. Kotarski

ATTORNEY

United States Patent Office 3,140,256
Patented July 7, 1964

3,140,256
SEPARATION PROCESS
Eugene C. Martin and Robert C. Binning, Texas City, and Leon M. Adams and Robert J. Lee, La Marque, Tex., assignors, by mesne assignments, to Standard Oil Company, Chicago, Ill., a corporation of Indiana
Filed Sept. 30, 1957, Ser. No. 687,284
14 Claims. (Cl. 210—23)

This invention relates to a separation process and particularly concerns a permeation process whereby organic compounds such as hydrocarbons, among others, may be concentrated or separated from mixtures thereof.

While permeation processes have heretofore been suggested for the separation of organic compounds such as hydrocarbons, the particular permeation membranes heretofore employed have not been completely satisfactory. Permeation membranes comprised of organo-soluble organic derivatives of cellulose, e.g., cellulose esters, cellulose ethers, mixtures of cellulose esters and cellulose ethers, or, etc., are quite effective for separating mixtures of organic compounds such as hydrocarbon mixtures, etc. However, in certain situations such membranes may not be sufficiently stable. Also, higher permeation rates and/or selectivity for a given component of the charge to the permeation process may be desired.

In a permeation process it is generally desired to operate at as high a temperature as is possible since the rate of permeation increases greatly as the permeation operating temperature is increased. At the higher permeation operating temperatures, the cellulose ester and/or ether permeation membranes are less stable and the membrane might rupture during the permeation process. Rupture of the membrane necessitates shutting down that particular permeation unit and replacing the membrane. The advantages of using a permeation membrane which is stable at higher permeation operating temperatures are many. It enables higher permeation rates and greater throughput per permeation unit; it minimizes the frequency of shutting down the permeation unit due to rupturing of the membrane; it may enable greater separation efficiency, etc.

Improving the selectivity of the permeation membrane for permeating a given component of the charge mixture has the advantage of producing a greater degree of separation per permeation stage and/or enabling the production of a higher concentration or purity of the desired product. By improving the permeation rates obtainable with the membrane, the size of the permeation units can be reduced for a given amount of charge stock to be separated, or the same size unit is capable of processing a greater amount of charge.

An object of the present invention is to provide an improved permeation process capable of higher permeation rates and/or greater separation efficiency. Another object is to provide a permeation process which employs an improved permeation membrane. A further object is to provide permeation membranes which have improved thermal stability and thus permit the use of a higher permeation temperature with its resultant increase in permeation rate. A still further object is to provide permeation membranes which display an increased selectivity for permeating a given component of the charge mixture in preference to other components of the charge mixture. Another object is to provide permeation membranes which display improved permeation rates. Other objects and advantages of the present invention will be apparent from the detailed description thereof.

The present invention is based upon the concept that permeation membranes comprised of organo-soluble organic derivatives of cellulose, particularly cellulose esters, cellulose ethers, mixtures of cellulose esters and cellulose ethers, can be modified to improve their characteristics as permeation membranes for the separation of organic mixtures such as a mixture of hydrocarbons, by reacting the free hydroxyl groups attached to the anhydroglucose units of the cellulose derivative with an organic reagent which is reactive with the hydroxyl groups. The organic reagent may contain one or more of the same or different functional groups, each of which are reactive with a hydroxyl group. A great variety of organic reagents and modifying techniques may be used. Aldehydes, mixtures of aldehydes with alcohols, organic diisocyanates, organic monoisocyanates, organic dichlorides such as chloride of dibasic acids, are examples of some of the organic reagents which may be employed for this purpose. Either a minor portion or else substantially all of the free hydroxyl groups attached to the anhydroglucose units of the cellulose derivatives may be modified by reaction with the organic reagent.

Cellulose is a high polymer composed of recurring anhydroglucose units. Each anhydroglucose unit contains three attached hydroxyl groups. Cellulose esters and ethers are formed from cellulose by the esterfication and etherification, respectively, of a portion of these hydroxyl groups. The cellulose esters and/or ethers which are modified and thereafter employed as permeation membranes are the organo-soluble cellulose esters and/or ethers. These cellulose esters and/or ethers may have an average of from 0.1 to 2.0, usually from about 0.2 to 1.0, free hydroxyl groups per anhydroglucose unit. By the term free hydroxyl groups is meant those remaining hydroxyl groups in the anhydrogluclose units which are not esterified or etherified in forming the cellulose ester or cellulose ether. Examples of cellulose esters are cellulose acetate-propionate, cellulose propionate, cellulose acetate-butyrate, cellulose butyrate, cellulose acetate-valerate, cellulose acetate-benzoate, etc. Examples of cellulose ethers are ethyl cellulose, propyl cellulose, ethyl-propyl cellulose, butyl cellulose, ethyl-butyl cellulose, amyl cellulose, benzyl cellulose, etc. Examples of some of the commercially available cellulose esters and ethers which may be modified in accordance with the present invention are cellulose acetate-butyrate which contains an average of between about 0.1 to 2.0 free hydroxyl groups per anhydroglucose unit, e.g. cellulose acetate-butyrate having an average of about 0.1 to 1.0 free hydroxyl groups per anhydroglucose unit, an average of about 0.2 to 0.6 acetyl groups per anhydroglucose unit, and an average of from about 1.5 to 2.4 butyryl groups per anhydroglucose unit; cellulose acetate-propionate having an average of from about 1.0 to 2.0 free hydroxyl groups per anhydroglucose unit; ethyl cellulose having an average of from about 0.4 to 1.0 free hydroxyl groups per anhydroglucose unit. While the modification of the organo-soluble organic derivatives of cellulose is described herein with particular reference to the cellulose esters or ethers, it is apparent that other derivatives of cellulose besides esters and/or ethers may also be so modified and formed into films for use as permeation membranes.

In effecting the modification of the cellulose ester and/or ether, an organic reagent which reacts with hydroxyl groups is employed. In the modification, the organic reagent reacts with the free hydroxyl groups attached to the anhydroglucose units and thereby modifies the permeation properties of the cellulose ester and/or ether. Examples of some of the varieties of organic reagents which may be used are aldehydes, mixtures of aldehydes with alcohols, organic diisocyanates, organic monoisocyanates, organic dihalides such as organic dibasic acid chlorides, organic dibasic acids or anhydrides, and mixtures of various of these organic reagents. A number of other organic reagents which are reactive with hydroxyl groups will occur to those skilled in the art. The organic reagents may contain one or more, preferably one or two, functional groups which are reacted with a hydroxyl group. These functional groups may be the same or different. When the organic reagent contains two such groups, cross-linking of the cellulose ester and/or ether occurs. Cross-linked cellulose esters and ethers have an improved thermal stability under permeation conditions which permits them to be used at higher permeation operating temperatures and consequently increases the permeation rates obtainable. In addition, cross-linking improves the selectivity of the permeation membrane for permeating a given component of the charge mixture in preference to other components of the charge mixture. Either a part, e.g. 5% or substantially all e.g. 95–100% of the free hydroxyl groups attached to the anhydroglucose units may be modified by reaction with the organic reagent, the particular percentage being reacted depends upon the particular charge to the permeation process, the permeation operating temperature, and the starting cellulose ester and/or ether to be modified.

A number of techniques may be used in carrying out the modification of the cellulose ester and/or ether with the organic reagent. A suitable technique consists of dissolving the cellulose ester and/or ether in a solvent (which is inert i.e. non-reactive with respect to the cellulose derivative and the organic reagent). The solvent should also be capable of dissolving the organic reagent, and should boil at or above the temperature at which the reaction is carried out. The solution of the cellulose derivative is contacted with the desired amount of the organic reagent whereupon the reaction occurs between the organic reagent and the free hydroxyl groups attached to the anhydroglucose units of the cellulose ester and/or ether. Thereafter the modified cellulose derivative is recovered from the solution and formed into a thin film which is used as the permeation membrane. In certain instances it may be desirable to carry out the modification reaction only to a partial extent and to carry out the reaction further after the partly modified cellulose derivative has been formed into a film. Another method of carrying out the modification reaction consists of treating a film of the cellulose ester and/or ether with a solution of the organic reagent. The solution of the organic reagent should preferably be in dilute form. Still another manner of carrying out the modification of the cellulose ester and/or ether provides a method of modification which is restricted more to the surface of the film and minimizes modification through the thickness of the film. This technique consists of directing vapors of the organic reagent against the surface of a preformed film of cellulose ester and/or ether. This technique is particularly useful when a modifying agent effects a cross-linking of the cellulose derivative, and when this technique is used to effect cross-linking it is preferred to treat only one side of the film with the vapors of the organic reagent. When this treated film is employed as a permeation membrane, the treated side of the film is preferably in contact with the charge mixture to be separated while the untreated side of the film is in contact with the permeate zone from which the mixture permeating through the membrane is removed. The cellulose esters and/or ethers may be subjected to a sequence of modifications using the same or a different organic reagent in the second modification step wherein the same or a different technique for effecting the modification can be used. For example the cellulose derivative may be reacted, while in solution, with an organic diisocyanate, and thereafter reacted with an aldehyde. It is to be understood that the modified cellulose ester and/or ether permeation membranes employed in the practice of the present invention may contain minor amounts of other ingredients such as plasticizers, antioxidants, etc. which do not detract from their utility as permeation membranes.

Films of the non-modified cellulose esters and/or ethers are usually employed as permeation membranes for the separation of mixtures of hydrocarbons. The modified cellulose esters and/or ethers of this invention are even more useful for such separations. Hydrocarbons may be separated by type, i.e. separation of aromatic hydrocarbons from unsaturated hydrocarbons (such as diolefins or olefins) and/or from paraffin hydrocarbons. Or a separation can be made based upon molecular configuration, i.e. a separation of branched chain aliphatic hydrocarbons from other aliphatic hydrocarbons which have a different number of branched chains present therein. The aromatic hydrocarbons permeate more rapidly than unsaturated hydrocarbons which in turn permeate more rapidly than the saturated hydrocarbons i.e. paraffins. Aliphatic hydrocarbons which have a lesser number of branched chains permeate more rapidly than those aliphatic hydrocarbons having a greater number of branched chains. With respect to the effect of molecular weight upon the rate of permeation, the lower molecular weight hydrocarbons in general tend to permeate more rapidly than the higher molecular weight hydrocarbons of the same structure. The selectivity of the permeation membrane i.e. the efficiency of the separation which may be looked upon as similar to beta values in solvent extraction or alpha values in fractionation, is measured by the difference between the concentration of the more rapidly permeating component in the permeate zone and the concentration of this same component in the feed zone of the permeation apparatus. Modifying the cellulose esters and/or ethers does not change the relative order in which the hydrocarbons of different types and structure permeate as described above, but it may increase the permeation rate and/or the selectivity, i.e. the separation efficiency may be improved by magnifying the differences between the rates at which individual hydrocarbons permeate. From the discussion of the relative order in which hydrocarbons permeate through the membranes, it is evident that many diverse mixtures of hydrocarbons can be separated by use of the present invention. While the invention has been described hereinabove with reference to the separation of hydrocarbons, the modified cellulose esters and/or ethers can be employed in the separation of other organo-soluble mixtures of organic chemicals including mixtures of organic oxygen-containing compounds, organic sulfur-containing compounds, organic halogen-containing compounds, mixtures of the above compounds or mixtures thereof with hydrocarbons, etc. Other film-forming materials which contain reactive hydroxyl groups may similarly be modified by reaction with organic reagents reactive with these groups to produce modified films having improved properties as permeation membranes when used for the separation of organic chemicals including hydrocarbons, water, or various mixtures thereof. For example, the hydroxyl groups in hydrolyzed polyvinyl acetate may be reacted with organic reagents and films thereof can be used as permeation membranes.

In its fundamental form, a permeation unit consists of an enclosed vessel separated into two chambers by the permeation membrane. The charge mixture to be separated is introduced into one chamber wherein it contacts one side of the permeation membrane. The permeation membrane permits the preferential permeation of one component of the charge mixture in preference to other components thereof. Thus the portion of the charge mixture which permeates through the membrane and is removed from the opposite side thereof into the permeation zone is enriched in that component of the charge mixture which permeates more rapidly. Permeation is a non-equilibrium process, i.e. the concentration of the more rapidly permeating components in contact with the charge side of the permeation membrane must be higher than the concentration of these same components in contact with the permeate side of the membrane, or otherwise permeation will not occur. Non-equilibrium conditions are usually provided for by rapidly withdrawing the permeated portion from contact with the permeate side of the membrane. As to the physical conditions employed during permeation, the charge mixture introduced into the feed zone may be in the liquid state, and the permeated portion may be removed from the opposite side of the membrane in the vapor or liquid state; or the charge mixture can be maintained in the vapor state and the permeated portion removed from the opposite side of the membrane in the vapor state. Higher pressures are generally employed in the feed zone than in the permeate zone. Temperatures as high as the permeation membrane is capable of withstanding without rupturing due to thermal instability in the presence of the mixtures undergoing separation are generally employed, since the rate of permeation increases in the neighborhood of 50% for each 10° to 20° C. increase in temperature. The permeation membrane is a thin film usually less than 10 mils in thickness, and preferably 1.0 mil or less in thickness.

A number of examples of the manner in which the cellulose esters and/or ethers may be modified by reaction with an organic reagent reactive with the hydroxyl groups follows. When the term "free hydroxyl group" is employed herein, it is to be understood to mean the remaining unreacted hydroxyl groups attached to the anhydroglucose units of the cellulose derivative.

ALDEHYDE MODIFICATION—MEMBRANE RATE IMPROVEMENT

The free hydroxyl groups in an organo-soluble cellulose ester and/or ether can be reacted with an aldehyde to improve the permeation rate of the membrane prepared from the cellulose derivative. It is believed that an acetal is formed by the reaction. Any of a wide variety of aldehydes may be employed in this modification, for example aldehydes having from 1 to 12 carbon atoms may suitably be used. The organic radical of the aldehyde may be an aliphatic, aromatic, or alicyclic radical, and may also contain other substituents. Formaldehyde has been found to be highly effective as a modifying agent, but other aldehydes such as acetaldehyde, propionaldehyde, butyraldehyde, 2-ethylhexaldehyde, ethoxyacetaldehyde, phenoxyacetaldehyde, etc. can be used.

The manner in which the cellulose derivative is reacted with the aldehyde to improve the permeation rate of a cellulose derivative membrane consists in dissolving the cellulose derivative in an inert organic solvent, such as dioxane, methyl ethyl ketone, ethylene dichloride, etc., and contacting the solution with the aldehyde. A small amount of a mild acid catalyst such as stearic acid, oxalic or acetic acid, etc., (preferably while in a solvent such as carbon tetrachloride) may be added to assist in speeding up the reaction. The aldehyde may be employed in the reaction in the amount of at least 0.1 mol per each free hydroxyl group (attached to the anhydroglucose units) which is present in the reaction zone. An equal number (or even a great excess) of mols of aldehydes per free hydroxyl groups contained in the amount of cellulose derivative present in the reaction zone can be used. The reaction mixture is maintained at about 50° C., although temperatures as low as 10° C. or as high as the boiling point of the solvents used, may be employed. The solution is heated until it is free of bubbles (the presence of bubbles would prevent casting a continuous film). Thereafter films are formed by casting the solution of the aldehyde-modified cellulose derivative onto steel panels and drying the cast films under heat lamps or the like to evaporate the solvent. After the films have dried, they are placed in an oven at about 90° to 100° C. for 0.5 to 0.75 hour (as little as 0.1 to as long as 2.0 hours may be used) in order to complete the reaction.

*Example 1*

30 parts by weight of ethyl cellulose (N–50) which contained an average of approximately 0.52 free hydroxyl group and 2.48 ethoxyl groups per anhydroglucose unit was added to a solvent solution consisting of ⅓ acetone, ⅓ methyl ethyl ketone, and ⅓ methyl isobutyl ketone to obtain a viscous solution. To this solution was added 7.5 parts by weight of formalin (37% HCHO) together with 3 parts of a 5% stearic acid in carbon tetrachloride solution. Thus approximately 1.38 mols of aldehyde per mole of free hydroxyl groups (present in the amount of cellulose derivative used) was employed in carrying out the reaction. The mixture was blended and heated at 50° C. until the solution was free of bubbles. Thereafter films were formed by casting of the solution onto stainless steel panels. The film was dried under heat lamps and then placed in an oven at 80° C. for about 0.5 hour to complete the reaction. The aldehyde-modified ethyl cellulose film formed was 1.0 mils in thickness. This modified film and an ethyl cellulose (N–50) film of the same thickness which had not been modified by reaction with an aldehyde were employed as permeation membranes and their effectiveness determined.

Figure 1:
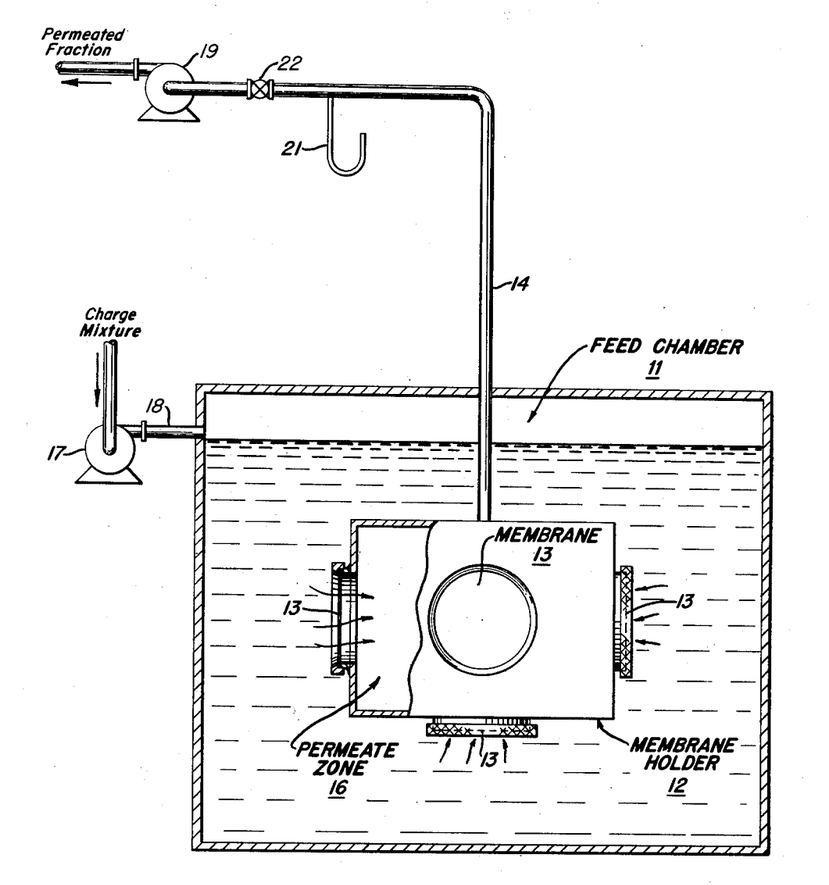

Attached FIGURE 1 represents in schematic form a small size permeation apparatus which was used in carrying out the permeation runs. The permeation apparatus consisted of a box-like feed chamber 11 for the feed mixture of liquid hydrocarbons introduced therein; a smaller size membrance holder 12 of box-like shape having 5 open faces across which the permeation membranes 13 were sealed, the 6th face having sealed thereto a line 14 for removing the portion which permeates through the membrane into the interior (permeate zone 16) of the membrane holder. The entire membrane holder was positioned within feed chamber 11. Pump 17 passes the charge mixture (which has been heated to the desired permeation operating temperature) through line 18 into feed chamber 11 until the liquid level of the charge mixture is substantially above membrane holder 12. The permeated portion is continuously withdrawn from permeate zone 16 through line 14 by means of vacuum pump 19. Manometer 21 and pressure regulating valve 22 measure and regulate the pressure in permeate zone 16. The total surface area provided by the membranes was approximately 22 sq. in. In the permeation experiments, the charge to the feed zone consisted of a 50–50 mixture of n-heptane and isooctane. A temperature of 70° C. was maintained in the feed zone and atmospheric pressure was maintained therein. The permeate zone was maintained at a pressure of 30 mm. Hg abs. Hydrocarbons which permeated through the membrane were removed from the opposite side of the membrane and into the permeate zone as vapors. The vapors were withdrawn continuously and their compositions were determined. The results obtained in the experiments were as follows:

| Permeation Membrane | Permeation Rate [1] | Percent n-Heptane in Permeate |
|---|---|---|
| Aldehyde-modified ethyl cellulose | 201 | 70 |
| Ethyl cellulose | 144 | 70 |

[1] Gallons/hour/thousand sq. ft. of membrane surface.

It is apparent that a substantial improvement in the permeation rate of the ethyl cellulose membrane was obtained by reaction of the free hydroxyl groups therein with the added aldehyde. The composition of the permeate portion was not changed by the aldehyde modification of ethyl cellulose.

ALDEHYDE MODIFICATION—MEMBRANE SELECTIVITY IMPROVEMENT

The free hydroxyl groups in an organo-soluble cellulose ester and/or ether can be reacted with aldehydes, such as those aldehydes which have been described previously, in a manner which results in an improvement in selectivity of the aldehyde-modified cellulose derivative when films made therefrom are employed as the permeation membrane for the separation of hydrocarbons. Selectivity of the resultant membrane can often be improved without any decrease in the rate at which hydrocarbons permeate through the membrane.

This modification technique consists of dissolving the cellulose derivative in the inert organic solvent, adding the aldehyde and also a minor amount of a condensation catalyst e.g. a strong acid catalyst such as toluene sulfonic acid, sulfuric acid, hydrochloric acid, oxalic acid, etc. The aldehyde may be present in the reaction zone in the amount of at least 0.1 mol per mole of free hydroxyl group (attached to the anhydroglucose units) contained in the amount of cellulose derivative present in the reaction zone. An equal number (or even a great excess) of mols of aldehyde per mole of free hydroxyl group present can be used. The mixture is heated to about 50° C. and stirred for from 1 to 8 hours, e.g. about 5 hours. Temperatures between 50° C. and 80° C. may be used during the condensation step. Upon completion of the reaction, which is believed to be a cross-linking of different cellulose chains through acetal formation, the solution is diluted with further amounts of inert solvent to decrease the viscosity. Thereafter a mixture of water plus inert solvent, e.g. a 50–50 water-acetone mixture is added to the dilute solution whereupon the aldehyde-modified cellulose derivative precipitates as a gelatinous material. The precipitated gel is then removed by decantation of the liquid, and the gel is redissolved in acetone. The resultant solution is poured into water to precipitate a fibrous polymeric material. Thereafter it is washed with water to remove any remaining amounts of solvent, drained dry, and then air dried. The product aldehyde-modified cellulose is then dissolved in a solvent, and the solution is employed for the casting of films. A conventional film casting technique such as casting of the solution on chrome-plated panels and placing the panels under heat lamps to evaporate the solvent, can be used.

In the precipitation of the gel, the solution of water-solvent mixture may be added in an amount sufficient to precipitate all of the aldehyde-modified cellulose derivative, or the water-solvent mixture may be added in an amount sufficient to precipitate only a portion of the aldehyde-modified cellulose derivative. If only a portion of the polymer is precipitated as a gel, the precipitated gel is removed by decantation from the liquid and the gel is processed as described above. To the remaining liquid are added additional amounts of the water-solvent mixture to cause precipitation of additional amounts of the gel. These additional amounts of gel are processed in the manner described. It has been found that the subsequent portions of gel which are precipitated generally provide a somewhat higher selectivity when permeation membranes are perpared therefrom than if the aldehyde-modified cellulose derivative were precipitated in toto.

*Example 2*

25 parts by weight of cellulose acetate-butyrate (AB-504-35) which had 0.96 free hydroxyl groups per anhydroglucose unit, 0.44 acetyl group per anhydroglucose unit, and 1.6 butyryl groups per anhydroglucose unit, was dissolved in approximately 200 parts of dioxane. To this solution was added 2 parts of para-formaldehyde and 1 part of toluene sulfonic acid. Thus approximately .81 mol of aldehyde per mole of free hydroxyl group (attached to the anhydroglucose units) was present in the reaction zone. The mixture was heated at about 55° C. with stirring for about 4.5 hours. Thereafter acetone was added to the solution to decrease its viscosity. A 50–50 mixture of water and acetone was then gradually added with stirring until substantially all of the aldehyde-modified cellulose derivative was precipitated as a gelatinous material. The liquid was decanted from the gelatinous material, and the gelatinous material was redissolved in acetone. Thereafter the acetone solution was poured into water and firm fibres were precipitated therein. The fibres were removed and washed several times with water to remove traces of acetone. The fibres were thereafter air dried.

The dried fibres were then dissolved in a solvent consisting of 30% benzene, 30% ethanol, 30% ethylene dichloride and 10% dioxane. This solution was then cast upon steel panels to form film which was dried under heat lamps. The film thickness was 1.0 mil. This aldehyde-modified film and a cellulose acetate butyrate film which had not been modified were employed as permeation membranes and their effectiveness determined.

The permeation experiments were carried out in the manner described in Example 1, except that the charge mixture was a 50–50 mixture of benzene and cyclohexane and the permeation temperature was 80° C. The results obtained in the permeation runs were as follows:

| Permeation Membrane | Permeation Rate [1] | Percent Benzene in Permeate |
|---|---|---|
| Aldehyde-modified cellulose acetate-butyrate | 75 | 86.8 |
| Cellulose acetate-butyrate | 63 | 84.0 |

[1] Gallons/hour/thousand sq. ft. membrane surface.

It will be noted that this particular method of carrying out the aldehyde modification of the cellulose derivative improves the selectivity of the membrane while maintaining essentially the same permeation rate or even improving the permeation rate.

*Example 3*

20 parts by weight of cellulose acetate-butyrate (AB-504-40), which had 1.00 free hydroxyl groups per anhydroglucose molecule, 0.50 acetyl group per anhydroglucose molecule, and 1.5 butyryl groups per anhydroglucose molecule, was dissolved in approximately 320 parts of dioxane and heated to about 55° C. 3 parts of concentrated HCl diluted with 10 parts of dioxane was added to the solution, followed by addition of 13 parts of 2-ethylhexaldehyde dissolved in 50 parts of dioxane. The solution of reactants thus contained approximately 1.46 mols of aldehyde per each free hydroxyl group (attached to the anhydroglucose units) present in the reaction mixture. The reaction mixture was maintained at about 55° C. for one hour. Thereafter the reaction mixture was diluted with about 300 parts of ethanol, and then a 60–40 ethanol-water mixture was added until about ⅓ to ¼ of the aldehyde-modified cellulose acetate-butyrate had precipitated from the reaction mixture as a gel. This first gel fraction was removed from the liquid by decantation of the latter, and then a 70–30 water-ethanol mixture was added to precipitate the remaining aldehyde-modified cellulose acetate butyrate from the decanted liquid as a second gel fraction. Excess liquid was removed from the gel fractions. The two gel fractions were separately air dried. After air drying they were individually dissolved in a solvent consisting of 30% benzene, 30% ethanol, 30% ethylene dichloride, and 10% dioxane. The separate solutions were then used to cast films approximately 0.4 mil in thickness, and the films were employed as permeation membranes to determine their effectiveness for separating a 50–50 mixture of benzene and cyclohexane at a permeation operating temperature of 80° C. while employing the permeation apparatus and techniques described in detail in Example 1. A cellulose acetate-butyrate (AB-504-40) membrane of the same thickness which had not been modified was employed in one permeation run to provide a standard for comparison. The results obtained in the experiments were as follows:

| Permeation Membrane | Percent Benzene in Permeate | Permeation Rate [1] |
|---|---|---|
| 2nd Fraction of aldehyde-modified cellulose acetate-butyrate | 87 | 116 |
| 1st Fraction of aldehyde-modified cellulose acetate-butyrate | 85 | 104 |
| Non-Modified cellulose acetate butyrate | 84 | 102 |

[1] Gallons/hour/thousand sq. ft. membrane surface.

While both fractions of the aldehyde-modified cellulose acetate-butyrate have been improved with respect to selectivity and permeation rate, it is evident that the second precipitated portion of the aldehyde-modified cellulose acetate-butyrate provides a greater improvement in selectivity and a greater permeation rate than does the first fraction.

*Example 4*

30 parts by weight of ethyl cellulose (G–100) which contained an average of approximately 0.75 free hydroxyl group and 2.25 ethoxyl groups per anhydroglucose unit was dissolved in approximately 200 parts of dioxane. To this solution was added 2 parts of para-formaldehyde and 1 part of toluene sulfonic acid. Thus approximately 0.67 mol of aldehyde per mole of free hydroxyl group was present in the reaction zone. The reaction was carried out and the aldehyde-modified ethyl cellulose was recovered in the manner described in Example 2. Permeation membranes were formed from this aldehyde-modified ethyl cellulose and were evaluated in permeation tests. The permeation test procedure of Example 1 was employed, with the only difference being that the charge mixture was a 50–50 mixture of methyl cyclohexane and isooctane and the permeation temperature was 100° C. The results obtained in the experiments were as follows:

| Permeation Membrane | Permeation Rate [1] | Percent Methyl Cycolhexane in Permeate |
|---|---|---|
| Aldehyde-modified ethyl cellulose | 153 | 68.7 |
| Ethyl cellulose | 154 | 66.0 |

[1] Gallons/hour/thousand sq. ft. membrane surface.

From the above examples it is apparent that this technique for carrying out the aldehyde modification of the cellulose derivative produces a permeation membrane which displays a higher selectivity.

ALDEHYDE–ALCOHOL MODIFICATION

The free hydroxyl groups in an organo-soluble cellulose ester and/or ether can be reacted with a mixture of an aldehyde and an alcohol. It has been found that permeation membranes prepared from the aldehyde-alcohol modified cellulose derivatives permit hydrocarbons to permeate the membrane more rapidly than the non-modified cellulose derivative. This improvement in permeation rate is often obtained without a decrease in selectivity of the membrane. It is believed that an alkoxyacetal derivative of the cellulose derivative is formed during the modification process, the alkoxy group depending upon the alcohol used and the acetal depending upon the aldehyde which is used. Thus when the alcohol is ethanol and the aldehyde is formaldehyde, the ethoxy formal of the cellulose derivative is formed. While paraformaldehyde is preferred, the reaction proceeds well with a formaldehyde-yielding substance such as trioxane, trioxymethylenes. Other aldehydes such as acetaldehyde and higher molecular weight aldehydes may be employed. Any of a variety of aliphatic alcohols containing up to about 10 carbon atoms or so may be used. Thus methanol, ethanol, propanol, butanol, etc., may be employed. The aldehyde and the alcohol may be employed in the modification reaction in amounts as low as 0.1 part of aldehyde and 0.1 mol of alcohol per mol of free hydroxyl group present in the amount of cellulose derivative subjected to the modification. An equal number (or even a great excess) of mols of aldehyde and mols of alcohol per mole of free hydroxyl group (contained in the cellulose derivative present in the reaction zone) can be used.

The manner in which the aldehyde-alcohol modification of the cellulose derivative may be carried out consists of dissolving the cellulose derivative in an inert organic solvent, and contacting the resultant solution with the desired amount of alcohol and aldehyde in the presence of a minor amount of an acid condensation catalyst such as an aromatic sulfonic acid, or a mineral acid such as HCl, etc. Generally the amount of solvent employed may range between 5 and 25 parts per part of cellulose derivative. Examples of various inert solvents which may be used are those such as dioxane, dioxolane; ketones, such as acetone, methyl ethyl ketone; ethers, such as dimethyl dioxane, the methyl ether of Cellosolve; esters such as ethyl acetate, butyl acetate, etc. The acid condensation catalyst may suitably be employed in an amount between 0.01 to 0.2 part per part of the cellulose derivative. The reaction can be carried out at temperatures in the range of about 10° C. to about 150° C., a temperature of about 50° C. being suitable, for a period of time of at least 1 hour or as long as 100 hours.

At the end of the reaction period, the solution is diluted with further amounts of the inert solvent to reduce the viscosity. A mixture of water plus solvent is added to the dilute solution whereupon the aldehyde-alcohol modified cellulose derivative precipitates as a gelatinous material. The precipitated gel is recovered by decantation of the liquid, and the gel is redissolved in the solvent. The resultant solution is poured into water to precipitate a fibrous polymeric material. This material is washed with water to remove any remaining amounts of solvent, drained dry, and then air dried. The fibrous polymeric material is then dissolved in a suitable solvent and this solvent is employed for casting the permeation membrane.

*Example 5*

30 parts by weight of cellulose acetate-butyrate (AB–504–35), which had 0.96 free hydroxyl group per anhydroglucose molecule, 0.44 acetyl group per anhydroglucose molecule, and 1.6 butyryl groups per anhydroglucose molecule, was dissolved in approximately 150 parts of dioxane. To this solution was added 10 parts of paraformaldehyde and 17.5 parts of ethanol, along with 2 parts of p-toluene sulfonic acid. Based upon the amount of cellulose acetate butyrate present in the mixture, the mols of formaldehyde per free hydroxyl group present was 3.38 and the mols of alcohol per free hydroxyl group present was 3.86. The mixture was stirred and maintained at a temperature of about 65° C. for about 6.5 hours. At the end of the reaction period, acetone was added to dilute the viscosity of the solution of reaction products. A 50–50 water-acetone mixture was then added to the reaction products whereupon the aldehyde-alcohol modified cellulose acetate-butyrate precipitated as a gelatinous material. The gelatinous material was recovered by decanting liquid, and the gel was dissolved in acetone. The resultant solution was poured into water whereupon a fibrous material was formed. This fibrous material was washed with water to remove remaining amounts of acetone; it was drained dry; and then air dried. Thereafter the fibrous material was added to a solvent mixture consisting of 30% benzene, 30% ethanol, 30% ethylene dichloride, and 10% dioxane. This solution was used for the casting of a film of the aldehyde-alcohol modified cellulose acetate butyrate. The film thickness was 1.0 mil.

This film, and a cellulose acetate-butyrate film which had not been modified by the aldehyde-alcohol technique, were employed as permeation membranes employing the permeation apparatus and techniques described in conjunction with Example 1. The only differences in the permeation operating conditions from that employed in Example 1 was in the membranes employed, the charge in this example was a 50–50 mixture of benzene and cyclohexane, and the permeation operating temperature in this example was 80° C. The results obtained were as follows:

| Permeation Membrane | Permeation Rate [1] | Percent Benzene in Permeate |
|---|---|---|
| Aldehyde-alcohol-modified cellulose acetate-butyrate | 93 | 84 |
| Cellulose acetate-butyrate | 63 | 84 |

[1] Gallons/hour/thousand sq. ft. membrane surface.

The aldehyde-alcohol modified cellulose derivative has approximately the same selectivity as the non-modified cellulose derivative, but the permeation rate obtained with the modified derivative is approximately 50% higher.

*Example 6*

30 parts by weight of cellulose acetate butyrate (AB-504-35), having 0.96 free hydroxyl group, 0.44 acetyl group, and 1.6 butyryl groups per anhydroglucose molecule, was dissolved in approximately 150 parts of dioxane. 6.3 parts of paraformaldehyde, 16.0 parts of n-butanol, and 2 parts of p-toluene sulfonic acid were added to the dioxane solution. Based upon the amount of cellulose acetate butyrate present in the dioxane solution, the mols of formaldehyde per free hydroxyl group present was 2.1, and the mols of n-butanol per free hydroxyl group present was 2.2. The reaction was carried out in the same manner as described for Example 5, and the reaction product was recovered and a film was cast therefrom also in the same manner as described in Example 5. The aldehyde-alcohol modified celluose acetate butyrate was then employed in the same permeation experiments as described in Example 5. The results follow:

| Permeation Membrane | Permeation Rate | Percent Benzene in Permeate |
|---|---|---|
| Aldehyde-alcohol-modified cellulose acetate-butyrate | 103 | 82 |
| Cellulose acetate-butyrate | 63 | 84 |

*Example 7*

30 parts by weight of ethyl cellulose (G-100), which contained an average of approximately 0.75 free hydroxyl groups and 2.25 ethoxyl groups per anhydroglucose molecule, was dissolved in approximately 150 parts of dioxane. To the resultant solution was added 2.0 parts of paraformaldehyde, 14.0 parts of ethanol, and 2.0 parts of p-toluene sulfonic acid. The resultant solution thus contained 0.67 mol of formaldehyde mole of free hydroxyl group and 3.0 mols of ethanol per mole of free hydroxyl group. The reaction was carried out in the same manner as described in Example 5, and the reaction product was recovered and a film was prepared therefrom in the same manner as described in Example 5. The modified ethyl cellulose membrane was then compared with a non-modified cellulose membrane employing the permeation apparatus and conditions described in Example 1 except that the permeation temperature was 101° C. and the charge mixture was a 50–50 methylcyclohexane-isooctane mixture. The results obtained are as follows:

| Permeation Membrane | Perme-Rate [1] | Percent Methyl-cyclohexane in Permeate |
|---|---|---|
| Aldehyde-alcohol modified ethyl cellulose | 192 | 68.4 |
| Ethyl cellulose | 154 | 66.0 |

[1] Gallons/hour/thousand sq. ft. membrane surface.

ORGANIC DIISOCYANATE MODIFICATION

When an organic diisocyanate is used to modify the organo-soluble organic derivative of cellulose, it may have a number of beneficial effects when the resultant product is employed as a permeation membrane. The diisocyanate modified cellulose derivative which is employed as the permeation membrane is more stable at higher permeation temperatures. Thus it can be used at higher temperatures, without danger of rupturing the membrane, and thereby obtain the benefit of higher permeation rates which occur at the higher permeation temperatures. Additionally, the diisocyanate modified cellulose derivatives may display a higher selectivity for permeating one hydrocarbon in preference to another when permeation membranes are prepared from the diisocyanate modified cellulose derivative.

Various organic diisocyanates, such as may be represented by the formula $R(NCO)_2$ wherein R may be an aromatic, aliphatic, or cycloaliphatic hydrocarbon radical containing from 4 to 16 carbon atoms, may be used. The particular hydrocarbon radical contained in the organic diisocyanate is relatively unimportant, but the diisocyanate groupings are of great importance in improving the properties of the cellulose derivative. The diisocyanate is believed to react with the free hydroxyl groups attached to the anhydroglucose units and thereby produce cross-linking of the same cellulose chain polymer as well as cross-linking with adjacent cellulose chain polymers. Organic diisocyanates such as m-tolylene diisocyanate (and also bi-tolylene diisocyanate) are a very suitable aromatic diisocyanate. Other diisocyanates such as hexamethylene diisocyanate, dianisidine diisocyanate, hexylene diisocyanate, etc., may be used. In effecting the reaction between the cellulose derivative and the organic diisocyanate, the cellulose derivative is dissolved in an inert solvent. The organic diisocyanate and a small amount of a basic catalyst, preferably a mild base such as an organic amine e.g. N-methyl morpholine, pyridine, triethyl amine, etc., are added to the resultant solution. It is then heated to a temperature between about 20° C. and 120° C., e.g. about 50° C. for about 0.1 hour to 2.0 hours, e.g. about 0.5 hour. The amount of organic diisocyanate which may be added to the solution of the cellulose derivative can be from 0.01 mol to 1.0 mol or more (e.g. 0.1 to 0.5 mol) per mole of free hydroxyl group (in the cellulose derivative) contained in the solution. After the reaction has been completed, the resultant solution can be used to cast thin films which are then used as the permeation membranes.

Other techniques for carrying out the reaction between the hydroxyl group attached to the anhydroglucose units of the cellulose derivative and the organic diisocyanate may be used. For example one side of a thin film of the cellulose derivative may be placed in contact with a hydrocarbon solution containing a very low concentration of the organic diisocyanate. The cellulose derivative should be contacted with the dilute organic diisocyanate solution for only a very short time, e.g. less than about 5 minutes and preferably less than 1 minute. The film is then removed and heated at a temperature between 50 and 150° C. for about 0.1 to 1 hour or thereabouts. Contacting the cellulose derivative film with vapors of the cross-linking agent is another technique for effecting surface cross-linking, without substantial cross-linking throughout the thickness of the film, which will be discussed later in greater detail.

*Example 8*

10 parts by weight of ethyl cellulose (G-100), which contained an average of approximately 0.75 free hydroxyl group and 2.25 ethoxyl groups per anhydroglucose molecule was dissolved in 190 parts of a solvent mixture composed of 47% ethylene dichloride, 16% benzene, 10% methyl isobutyl ketone, 10% acetone, and 17% N-N dimethylformamide. To this solution was added 1.2 parts of 2,4-tolylene diisocyanate and 0.2 part of N-methyl morpholine. The solution of reactants thus contained 0.21 mol of tolylene diisocyanate per mole of free hydroxyl groups attached to the anhydroglucose units. The solution was heated at a temperature of about 60° C. for about 0.5 hour. This same procedure was employed in preparing another organic diisocyanate modified ethyl cellulose reaction product, except that 3.24 parts of 2,4-tolylene diisocyanate were employed (this provided a ratio of 0.566 mol of tolylene diisocyanate per mole of free hydroxyl groups attached to the anhydroglucose units). Films where cast from the above solutions on steel panels and dried under heat lamps. The resultant films were approximately 1.0 mil in thickness. These films were then used as permeation membranes employing the permeation operating conditions and techniques as set out in Example 1 except that the permeation operating temperature was 100° C. The charge mixture to the permeation apparatus was a 50–50 mixture of n-heptane and isooctane. The following results compare the effectiveness of a non-modified ethyl cellulose with the effectiveness of the ethyl cellulose modified by reaction with the different amounts of organic diisocyanate:

| | Diisocyanate used, in mols per Free Hydroxyl Group | Percent n-Heptane in Permeate |
|---|---|---|
| Ethyl Cellulose | None | 75 |
| Do | 0.21 | 83 |
| Do | 0.57 | 90 |

It will be noted that a substantial improvement in selectivity of the membrane has been obtained by modification thereof with the organic diisocyanate. The selectivity for n-heptane has been increased from 75% up to 90%.

*Example 9*

10 parts by weight of ethyl cellulose (N–50) having the composition heretofore defined was dissolved in approximately 90 parts of a solvent which consisted of 17.5 parts of acetone, 17.5 parts of MIK and 55 parts of ethylene dichloride. To this solution was added 0.6 part of bi-tolylene diisocyanate and 0.3 part of N-methyl morpholine. The solution of reactants thus contained .065 mol of the bi-tolylene diisocyanate per mole of free hydroxyl group attached to the anhydroglucose units. The cross-linking reaction was carried out in the same manner as described in Example 8 and a film 1.0 mil in thickness was produced from this bi-tolylene diisocyanate modified ethyl cellulose. The film so produced was employed as the permeation membrane using the permeation operating conditions and techniques as set out in Example 1 except for the permeation operating temperature. A non-modified ethyl cellulose membrane (N–50) was also evaluated for comparative purposes. The charge mixture used consisted of a 50–50 mixture of n-heptane and isooctane. The permeation operating temperatures, as well as the results obtained in the permeation experiments, were as follows:

| Membrane | Permeation Temp., ° C. | Permeation Rate [1] | Percent n-Heptane in Permeate |
|---|---|---|---|
| Ethyl cellulose | 80 | 250 | 70 |
| Do | 100 | Ruptured | |
| Diisocyanate-modified ethyl cellulose | 100 | 266 | 77 |

[1] Gallons/hour/thousand sq. ft. membrane surface.

It should be noted that the non-modified membrane ruptured when an attempt was made to use it at a permeation operating temperature of 100° C. This non-modified ethyl cellulose is not stable during permeation of the charge mixture at such temperatures. However, the bi-tolylene diisocyanate modified ethyl cellulose can withstand such a temperature due to its increased stability, and in addition the selectivity is substantially higher. Its increased stability enables it to be used at a higher temperature at which higher permeation rates are obtainable.

DIISOCYANATE MODIFICATION FOLLOWED BY ALDEHYDE MODIFICATION

The cellulose esters and/or ethers which contain free hydroxyl groups may be subjected to a series or a sequence of modifications. For example the cellulose derivative may be reacted with an organic diisocyanate in the manner described in the immediately preceding section, and thereafter it may be reacted with an aldehyde according to techniques described previously herein, preferably according to the rate improvement technique. When the cellulose derivative is modified by a sequence of modifications, the first modification step is preferably carried out by reacting only a portion of the free hydroxyl groups in the cellulose molecule with the modifying agent. Thus when a solution of the cellulose polymer is reacted with a liquid modifying agent in the first modification step, the amount of modifying agent employed therein may be less than that stoichiometrically necessary to react with the free hydroxyl groups contained in the cellulose molecule. The amount of modifying agent employed in the second or subsequent modification steps may also be less than that necessary to react with the remaining free hydroxyl groups attached to the cellulose polymer, but usually an excess amount is used.

*Example 10*

12 parts of ethyl cellulose (N–50), having the composition previously described, was dissolved in 137 parts of a mixture of solvents which consisted of 25% methyl isobutyl ketone, 23% acetone, 32% ethylene dichloride, and 20% of 4-methyl, 2-pentanone. To this solution was added 0.75 part of 2,4-tolylene diisocyanate and 0.5 part of N-methyl morpholine. The solution of reactants thus contained 0.167 mol of tolylene diisocyanate per mole of free hydroxyl group (attached to the cellulose derivative) which was present in the solution. The resultant mixture was heated at a temperature of about 55° C. for about 0.5 hour. Upon completion of the reaction, 0.4 part of formaldehyde (together with 1 part of a 5% stearic acid solution in $CCl_4$) was added to the solution. Based upon the number of free hydroxyl groups present in the starting ethyl cellulose material, the added aldehyde amounted to 0.49 mol of formaldehyde per mole of free hydroxyl groups present in the ethyl cellulose initially used. The reaction mixture was maintained at a temperature of about 50° C. until free of bubbles. The solution was then cast upon panels to form films which were then dried under two 250-watt heat lamps. The 1 mil thickness films were then cured at 100° C. for 0.75 hr. to complete the reaction.

The modification of ethyl cellulose (N–50) with 2,4-tolylene diisocyanate was repeated using the same amounts and conditions for effecting the modification. Thereafter the diisocyanate-modified product was modified by reaction with 1 part of butyraldehyde employing the aldehyde modifying technique used in the preceding paragraph. The butyraldehyde was present during the aldehyde modification step in an amount equal to 0.51 mol per mol of free hydroxyl group present (in the initial N–50) in the amount of ethyl cellulose employed. Film of 1.0 mil thickness was prepared by casting from the solution of reaction products and then using as described in the preceding paragraph.

The sequence of modification steps described in the preceding paragraph was repeated except that 1 part of cinnamaldehyde was used in place of the butyraldehyde. Thus the cinnamaldehyde was employed in the amount of 0.281 mol per mol of free hydroxyl group present (in the initial N–50) in the ethyl cellulose employed. Film of 1.0 mil thickness was prepared by casting from the diisocyanate-aldehyde modified ethyl cellulose solution and then curing. Each of the films were then employed as permeation membranes using the apparatus and technique described in Example 1. The permeation temperature used was 100° C., and the charge stock was a 50–50 mixture of n-heptane and isooctane. The results which were obtained with these diisocyanate-aldehyde modified membranes were as follows (for comparison a permeation run was carried out employing an ethyl cellulose membrane which had been modified by reaction with the same amount of 2,4-tolylene diisocyanate but without subsequent modification with an aldehyde):

| Cellulose Derivative | Diisocyanate | Aldehyde | Permeation Rate [1] | Percent n-Heptane in Permeate |
|---|---|---|---|---|
| Ethyl cellulose | 2,4-tolylene- | None | 190 | 66.4 |
| Do | do | Formaldehyde | 352 | 66.5 |
| Do | do | Butyraldehyde | 293 | 67.4 |
| Do | do | Cinnamaldehyde | 311 | 64.0 |

[1] Gallons/hour/thousand sq. ft. of membrane surface.

MODIFICATION WITH MIXTURE OF ORGANIC DIISOCYANATES AND POLYGLYCOLS

When the organic diisocyanate modification of the cellulose derivatives is carried out in the presence of a polyglycol, e.g. polyalkylene glycols, it has been noted that a permeation membrane prepared from such a modified cellulose derivative may have an improved selectivity when separating hydrocarbons and/or may permit the hydrocarbons to permeate more rapidly through the membrane. In effecting this modification with the mixture of organic diisocyanate and polyalkylene glycols, the reaction is effected in the same manner as described in the section concerning Organic Diisocyanate Modification, except that the polyalkylene glycol (or a reaction product thereof with the diisocyanate) is present during the reaction with the diisocyanate.

Various polyalkylene glycols may be employed, for example polyethylene glycol having a molecular weight of from 100 to 500, e.g. 200 polypropylene glycols of a similar molecular weight range, polyethylene glycol of glycerol, polypropylene glycol of glycerol, etc. The amount of polyalkylene glycol which is used should preferably be less than about 20% by weight based upon the total reactants. As was indicated in the section concerning Organic Diisocyanate Modification of the cellulose derivative, the amount of organic diisocyanate may be from 0.01 to 1.0 or more moles of diisocyanate per each free hydroxyl group (contained on the anhydroglucose units) present in the reactant mixture. The modification reaction conditions, recovery of the reaction product, and casting of the modified cellulose derivative into films is discussed in detail in the section concerning the Organic Diisocyanate Modified membrane.

Example 11

10 parts by weight of ethyl cellulose (G–100), having .75 free hydroxyl group and 2.25 ethoxyl groups per anhydroglucose unit, was dissolved in 180 parts of a solvent which consisted of 90 parts of ethylene dichloride, 30 parts of benzene, 20 parts of methyl isobutylketone, 20 parts of acetone and 20 parts of N,N-dimethylformamide. In another container, 2.0 parts of a polyethylene glycol derivative of glycerol (Dow–15–200) which had a molecular weight of approximately 200 was dissolved in 5.0 parts of benzene. To this solution was added 0.5 part of N-methyl morpholine and 1.0 parts of 2,4-tolylene diisocyanate, and this second solution was held at room temperature for 0.25 hour. The two solutions were then mixed. To the resultant mixture were added 1 part of N-methyl morpholine and 2.68 parts of 2,4-tolylene diisocyanate. The solution of reactants thus contained 3.68 parts of 2,4-tolylene diisocyanate. Thus, the solution contained 15.7% by weight of the polyethylene glycol based on the total reactants, i.e., based on the total weight of ethyl cellulose, 2,4-tolylene diisocyanate and polyethylene glycol of glycerol. The resultant mixture was heated at a temperature of about 60° C. for about 0.5 hour. Thereafter, the diiocyanate-polyethylene glycol modified ethyl cellulose was formed into film by casting the solution of reaction product onto steel panels and drying the film under heat lamps. The resultant film was approximately 1.0 mil in thickness. The film was then used as a permeation membrane employing the permation operating conditions and techniques as set out in Example 1 except that the permeation temperature was 100° C. The charge mixture to the permeation apparatus was a 50–50 mixture of n-heptane and isooctane. A comparative permeation run was carried out under the same conditions but employing a non-modified ethyl cellulose (G–100) permeation membrane. The results obtained in the permeation runs are as follows:

| Permeation membrane: | Percent n-Heptane in Permeate |
|---|---|
| Diisocyanate-polyethylene glycol modified ethyl cellulose | 89 |
| Non-modified ethyl cellulose | 75 |

MODIFICATION WITH MIXTURE OF ORGANIC DIISOCYANATES, POLYGLYCOLS, AND POLYVINYL FORMALS

The effect upon membrane selectivity when the cellulose derivative is modified by reaction with a mixture of organic diisocyanate and polyalkylene glycol can be further improved by the addition of a polyvinyl formal to the reaction mixture before carrying out the reaction. The polyvinyl formal, which is a condensation product of polyvinyl alcohol and formaldehyde, is added to the reaction mixture of cellulose derivative, organic diisocyanate, and polyethylene glycol, in an amount which is preferably 10% by weight or less based upon the total amount of the specified reactants, although larger amounts of the polyvinyl formal may be employed if desired. Thereafter the modification reaction is carried out in the manner described in the preceding section concerning the Modification with Mixture of Organic Diisocyanates and Polyglycols.

Example 12

10 parts by weight of ethyl cellulose (G–100) and 2.0 parts of polyvinyl formal were dissolved in 190 parts of a solvent which consisted of 90 parts ethylene dichloride, 30 parts benzene, 30 parts MIK, 20 parts acetone, and 20 parts of N,N-dimethyl-formamide. In another container were mixed 3.0 parts of the polyethyleneglycol of glycerol (Dow 15–200), 5 parts of benzene, 0.5 part of N-methyl morpholine, and 1.5 parts of 2,4-tolylene diisocyanate. This mixture was kept at room temperature for 0.25 hour and then mixed with G–100, polyvinyl formal solution. To the resultant solution were added 1.0 part of N-methyl morpholine and 3.5 parts of 2,4-tolylene diisocyanate. The solution of reactants thus contained 50% by weight of G–100 ethyl cellulose, 25% by weight of 2,4-tolylene diisocyanate, 15% by weight of polyethylene glycol of glycerol (Dow 15–200) and 10% by weight of polyvinyl formal based upon total reactants. The resulting solution was heated at a temperature of about 65° C. for about 0.5 hour. Thereafter the diisocyanate-polyethylene glycol-polyvinyl formal modified ethyl cellulose was formed into film by casting the solution of reaction product onto steel panels and drying the film under heat lamps. The resultant film was approximately 1.0 mil in thickness. The film was then used as a permeation membrane employing the permeation operating conditions and techniques as set out in Example 1 except that the permeation temperature was 104° C., and the charge mixture to the permeation apparatus was a 50–50 mixture of toluene and n-heptane.

For comparative purposes, a permeation run was carried out under the same conditions but employing the diisocyanate-polyethylene glycol modified ethyl cellulose (G–100) membrane which was prepared in the manner set out in Example 11. The results obtained in the permeation runs were as follows:

| Permeation membrane: | Percent toluene in permeate |
|---|---|
| Diisocyanate-polyethylene glycolpolyvinyl formal modified ethyl cellulose | 71 |
| Diisocyanate-polyethylene glycol modified ethyl cellulose | 67 |

The effect of the polyvinyl formal in improving the selectivity of the modified ethyl cellulose permeation membrane is apparent from the above results.

ALDEHYDE MODIFICATION FOLLOWED BY ORGANIC DIISOCYANATE MODIFICATION

While the organo-soluble cellulose esters and ethers may be modified by reaction with an aldehyde to improve the permeation rate and/or selectively of the cellulose derivative when used as a permeation membrane for the separation of hydrocarbons, further improvement in this aldehyde-modified cellulose derivative can be made by subsequent modification thereof with an organic diisocyanate. Organic diisocyanate modification of the aldehyde-modified cellulose derivative increases the stability of the modified cellulose derivative and enables it to withstand higher operating temperatures when used as a permeation membrane for the separation of hydrocarbons. Cellulose esters which are modified with an aldehyde and thereafter modified with the organic diisocyanate are particularly useful as permeation membranes for separating aromatic hydrocarbons from mixtures thereof with other hydrocarbons.

In carrying out the aldehyde modification step, the technique described in the earlier section regarding Aldehyde Modification-Membrane Selectivity Improvement is employed. It is preferred to employ the technique discussed in the aforementioned section and specifically in Example 3. In this technique, after completion of the aldehyde modification reaction, a mixture of water and solvent is added to the modification reaction product to cause precipitation of all of the reaction product, or preferably only a portion of the reaction product, as a gel. The gel is removed by decanting the liquid. If only a portion is precipitated, additional amounts of water-solvent are added to the decanted liquid to cause precipitation of the remainder of the aldehyde-modified reaction product as a second gel fraction. This second gel fraction of the aldehyde-modified cellulose derivative is decanted from the liquid and is then air dried. The air dried product is then employed in the organic diisocyanate modification reaction which is described in detail in the section concerning Organic Diisocyanate Modification.

*Example 13*

Cellulose acetate-butyrate (AB–504–40) was modified by reaction with 2-ethylhexaldehyde in the exact manner described in Example 3 to provide a first and a second air dried fraction of the aldehyde-modified cellulose acetate-butyrate. Approximately 2.8 parts by weight of the first fraction of the aldehyde-modified cellulose acetate-butyrate was dissolved in 40 parts of dioxane. Approximately 0.3 part of N-methyl morpholine and 0.113 part of 2,4-tolylene diisocyanate were added to the solution and the solution was heated at 65° C. for 0.5 hour. A film of about 0.4 mil in thickness was cast from this solution onto steel panels and dried under heat lamps. The film was then employed as a permeation membrane for separating a 50–50 mixture of benzene and cyclohexane using the permeation apparatus and techniques described in Example 1 except that the permeation temperature was 80° C. Approximately 6.3 parts by weight of the second fraction of the air dried aldehyde-modified cellulose acetate-butyrate (AB–504–40) was reacted with 0.226 part of 2,4-tolylene diisocyanate in the same manner as described in the preceding paragraph. A film aprproximately 0.4 mil in thickness was prepared from the reaction product in the manner described in the preceding paragraph. This film, as well as a non-modified cellulose acetate-butyrate (AB–504–40), were evaluated as permeation membranes in the manner described in the preceding paragraph. The results obtained in the permeation runs are as follows:

| | Percent benzene in permeate |
|---|---|
| Non-modified cellulose acetate-butyrate | 84 |
| 2nd fraction of aldehyde-modified cellulose acetate-butyrate, further modified with diisocyanate | 88 |
| 1st fraction of aldehyde-modified cellulose acetate-butyrate, further modified with diisocyanate | 87.4 |

ORGANIC MONOISOCYANATE MODIFICATION

When an organo-soluble cellulose ester and/or ether is modified by reaction with an organic monoisocyanate, the permeation membrane produced therefrom has a higher permeation rate than does the non-modified cellulose derivative. Various organic monoisocyanates, such as may be represented by the formula RNCO wherein R may be an aromatic, aliphatic, or cycloaliphatic hydrocarbon radical containing from 2 to 16 carbon atoms, may be used. Whereas the particular hydrocarbon radical may be of relatively little importance, the presence of the monoisocyanate grouping attached thereto is essential in order to form a stable bond between the hydrocarbon radical and the polymer chain. Aromatic monoisocyanates such as phenyl isocyanate are quite satisfactory. Other monoisocyanates such as butyl isocyanate, tolyl isocyanate, cyclohexyl isocyanate, etc., may be used.

In effecting the reaction between the cellulose derivative and the organic monoisocyanate, the cellulose derivative is dissolved in an inert solvent and the organic monoisocyanate is added to the solution. The solution of reactants is heated to a temperature betwen about 25° C. and 150° C., e.g. about 90° C. for about 0.5 hour to 24 hours, e.g. about 4 hours. The amount of the organic monoisocyanate which may be added to the solution of the cellulose derivative can be from 0.01 to 1.0 mols or more per mol of free hydroxyl group (attached to the anhydroglucose units) contained in the solution of reactants. After completion of the reaction, the reaction products are cooled (additional solvent being added if gelation tends to occur) and a mixture of solvent and water is gradually added to cause precipitation of the monoisocyanate-modified cellulose derivative as a gel. The liquid is decanted from the gel, and the gel is redissolved in solvent and thereafter poured into water to precipitate a fibrous material.

Rather than precipitating the total amount of the monoisocyanate-modified cellulose derivative as a gel, the water-solvent mixture can be added in a lesser amount so as to precipitate only a portion of the monoisocyanate-modified cellulose derivative as a gel. After removing the gel from the remaining liquid solution of reaction products, further amounts of the water-solvent mixture can be added to precipitate the remainder of the monoisocyanate-modified cellulose derivative as a gel. These separate gel portions are separately dissolved in a solvent and poured into water to effect precipitation of a fibrous material. The second or subsequent precipitated gel portions display a somewhat higher selectivity when formed into permeation membranes and employed for the separation of hydrocarbons than do membranes prepared from the first precipitated gel portions. The fibrous material may be washed with water to remove any remaining amounts of solvent and then the fibrous material is air dried. Thereafter it is added to a casting solvent from which thin films are cast and employed as the permeation membranes.

Example 14

5 parts by weight of cellulose acetate butyrate (AB-503-10), which contains 0.56 free hydroxyl group, 0.55 acetyl, and 1.99 butyryl group per anhydroglucose unit, was dissolved in a mixture of about 20 parts of dioxane and 10 parts of N,N-dimethyl formamide. Thereafter 0.2 part of phenyl isocyanate was added to the solution and the mixture heated to about 55° C. for about 5 hours. The added phenyl isocyanate amounted to 0.19 mol per mol of free hydroxyl group (attached to the anhydroglucose units) in the solution of reactants. The solution of reaction products was cooled, additional dioxane and N,N-dimethyl formamide being added to prevent gel formation, and was diluted further with ethanol. A 70-30 ethanol-water mixture was added to the solution of reaction product to cause precipitation of the latter as a gel. The liquid solution was decanted from the precipitated gel and the latter was dissolved in acetone and then poured into water to cause the precipitation of a fibrous phenyl isocyanate-modified cellulose acetate butyrate. The fibrous material was removed from water, air dried, and dissolved in a casting solvent system consisting of 4 parts ethanol, 4 parts ethylene dichloride, 4 parts benzene, and 2 parts dioxane. Film of 1.0 mil thickness was cast from this solution onto steel panels and dried under heat lamps. The film was then employed as a permeation membrane using the permeation apparatus and techniques set out in Example 1 except that the permeation operating temperature was 80° C. and the charge mixture to the permeation apparatus was a 50-50 mixture of benzene and cyclohexane. The following results compare the effectiveness of the phenyl isocyanate-modified cellulose acetate butyrate membrane with a non-modified cellulose acetate butyrate (AB-503-10):

| Permeation Membrane | Percent Benzene in Permeate | Permeation Rate [1] |
| --- | --- | --- |
| Phenyl isocyanate-modified cellulose acetate-butyrate | 74.4 | 187 |
| Unmodified cellulose acetate-butyrate | 75.0 | 142 |

[1] Gallons/hour/thousand sq. ft. of membrane surface.

It is apparent from the above that modification of an organo-soluble organic derivative of cellulose will increase the permeation rates of a permeation membrane prepared therefrom.

ORGANIC MONOISOCYANATE MODIFICATION FOLLOWED BY ALDEHYDE MODIFICATION

The modified cellulose derivative which was discussed in the preceding section entitled Organic Monoisocyanate Modification may subsequently be modified by reaction with an aldehyde to improve the permeation rate and/or selectivity of membranes prepared therefrom. The modification of the organo-soluble cellulose ester and/or ether by reaction with the organic monoisocyanate may be carried out in the manner described in the preceding section. Thereafter the monoisocyanate-modified cellulose derivative may be reacted with the aldehyde in the manner described in the earlier sections entitled Aldehyde Modification—Membrane Rate Improvement and Aldehyde Modification—Membrane Selectivity Improvement.

Example 15

5 parts by weight of cellulose acetate butyrate (AB-503-10) was modified by reaction with 0.2 part of phenyl isocyanate in the exact manner described in Example 14. The air dried monoisocyanate-modified cellulose acetate butyrate was then dissolved in a solvent system consisting of ⅓ acetone, ⅓ methyl ethyl ketone, and ⅓ methyl isobutyl ketone to form a viscous solution. To this solution was added 0.2 part of formaldehyde together with 0.5 part of a 5% solution of stearic acid in CCl₄. Thus the solution of reactants contained 0.76 mol of formaldehyde per mol of free hydroxyl groups (attached to the anhydroglucose units) which were present in the amount of the initial cellulose acetate butyrate (i.e. free hydroxyl groups present in the unmodified AB-503-10). The solution was mixed well and heated at 50° C. until free of bubbles. Thereafter the solution was cast on stainless steel panels to form film of about 1.0 mil thickness which was dried under heat lamps. After drying, the cast films were placed in an oven at about 80° C. for about 0.5 hour to complete the reaction. After completion of the reaction the film was employed as a permeation membrane, using the permeation apparatus and techniques described in Example 1 except that the permeation operating temperature was 80° C. and the charge hydrocarbon mixture was a 50-50 mixture of benzene and cyclohexane. The non-modified cellulose acetate butyrate (AB-503-10) and the monoisocyanate-modified cellulose acetate butyrate (AB-503-10) of Example 14 were also employed as permeation membranes under the same set of conditions. The results obtained with these three different membrane compositions were as follows:

| Permeation Membrane | Percent Benzene in Permeate | Permeation Rate [1] |
| --- | --- | --- |
| Phenyl isocyanate-aldehyde-modified cellulose acetate-butyrate | 75.3 | 256 |
| Phenyl isocyanate-modified cellulose acetate-butyrate | 74.4 | 187 |
| Unmodified cellulose acetate-butyrate | 75.0 | 142 |

[1] Gallons/hour/thousand sq. ft. of membrane surface.

MODIFICATION BY REACTION WITH ORGANIC HALIDES

The organo-soluble cellulose esters and/or ethers may be modified by reacting various organic halides with the hydroxyl groups attached to the anhydroglucose units of the cellulose derivatives. The organic halides may be mono- or dihalides. Modification with the monohalide improves the permeation rate of the cellulose derivative membrane, and modification with the dihalide improves the selectivity of the cellulose derivative membrane.

Organic phosphorous mono- and dihalides may be used, for example halophosphine oxides as represented by the structural formulae $RPOX_2$ (where X is a halogen atom) and $R(R^1)POX$, halophosphites as represented by $ROPX_2$ and $RO(R^1O)PX$, halophosphines as represented by $RPX_2$ and $R(R^1)PX$, halophosphates as represented by $ROPOX_2$ and $RO(R^1O)POX$. R and $R^1$ signify the same or different hydrocarbon radicals of from 2 to 10 carbon atoms which may be aromatic, aliphatic, cycloaliphatic, etc., groupings. When using organic phosphorous halides of the above type, an organophosphorous-modified cellulose derivative is produced. Similarly, organosulfonyl halides, organosulfenyl halides, organosulfoxyl halides, etc., may be used. The attached halogen may for convenience be chlorine atoms.

The organic halide may be employed in an amount from about 10 to 100% or more of that theoretically necessary to react with the free hydroxyl groups attached to the cellulose derivative (theoretically, each halogen atom in the organic halide reacts with one hydroxyl group with hydrogen chloride being evolved). The reaction is carried out under anhydrous conditions (water causes undesirable side reactions) and in the presence of an inert solvent. A hydrogen chloride acceptor or abstraction agent, i.e. any agent which will remove the evolved hydrogen chloride by holding it captive or reacting with it, is preferably added to the solution of reactants. Examples of such acceptors are pyridine or other basic amines. The reaction may be carried out by maintaining the solution of reactants at a temperature between about 40° C. up to the reflux temperature of the solution for a period of time between 0.5 to 5 hours or longer. When organic dihalides are employed, a cross-linking effect is obtained which improves the stability of the modified cellulose derivative and makes it useful as a permeation membrane at higher temperatures while also making it more selective when separating mixtures of hydrocarbons.

After the modification reaction has been carried out, the solution of reaction products may be diluted with a mixture of an inert solvent and water to cause precipitation of the reaction product as a gel. The water-solvent mixture may be added to precipitate all, or preferably only a fraction of the modified cellulose derivative. When only a portion is precipitated, the precipitated gel is recovered by decanting the liquid solution. Additional amounts of the water-solvent mixture are gradually added to the decanted liquid to precipitate the remainder of the modified cellulose derivative as a gel. Each of the separately precipitated portions of gel are then dissolved in a solvent and the resultant solutions are separately poured into water to cause precipitation of the modified cellulose derivative as a fibrous material. Thereafter the fibrous materials are washed with water to remove any remaining amounts of solvent, drained dry, and then air dried. They are thereafter dissolved in a suitable film-casting solution from which thin films suitable as permeation membranes are cast.

*Example 16*

Approximately 20 parts by weight of cellulose acetate-butyrate (AB-502-10), having an average of 0.27 free hydroxyl group, 0.53 acetyl group and 2.2 butyryl groups per anhydroglucose unit, was dissolved in about 200 parts of dry dioxane. Dry pyridine in the amount of 7.3 parts was added to the solution and the mixture was heated to 73° C. Thereafter about 11.7 parts of phenyl dichlorophosphine oxide was added to the solution and the resultant mixture was maintained at about 70° C. for 4 hours. Thus the solution of reactants contained 3.75 mols of phenyl dichlorophosphine oxide per mol of free hydroxyl group (attached to the anhydroglucose units) contained in the solution of reactants. This is substantially in excess of the amount of dichloride necessary to react with the hydroxyl groups. The solution of reaction products was diluted with about 2 volumes of acetone to reduce its viscosity, and then a 50-50 water-acetone mixture was gradually added with stirring until the organophosphorous-modified cellulose acetate-butyrate had precipitated as a gelatinous material. This material was then separated from the liquid solution and thereafter dissolved in 8 parts of acetone. The acetone solution was poured into water and a firm fibrous material was precipitated. After washing the fibrous material with water to remove remaining traces of acetone, it was thereafter air dried.

Permeation membranes were prepared from the original cellulose acetate-butyrate and also from the organophosphorous-modified cellulose acetate-butyrate by dissolving each of the cellulose compounds separately in a solvent system consisting of 30 parts benzene, 30 parts ethylene dichloride, 30 parts ethanol and 10 parts dioxane, and subsequently casting films of 1 mil thickness from these solutions. These films were employed as permeation membranes employing the permeation apparatus and techniques described in Example 1, except that the permeation temperature was 80° C. and the hydrocarbon charge mixture was a 50-50 mixture of benzene and cyclohexane. The results obtained in the permeation experiments are as follows:

| Permeation membrane: | Percent benzene in permeate |
|---|---|
| Organophosphorous-modified cellulose acetate-butyrate | 72.8 |
| Unmodified cellulose acetate-butyrate | 67.0 |

The improvement in selectivity of the organophosphorous-modified cellulose acetate-butyrate is evident from the above results. Membranes having improved permeation rates were also prepared by using dibutyl chlorophosphate and diethyl chlorophosphate as modifying agents for cellulose derivatives.

MODIFICATION OF SURFACE OF ORGANIC CELLULOSE DERIVATIVE

When the organo-soluble organic derivative of cellulose is modified by reacting the free hydroxyl groups (attached to the anhydroglucose units) with an organic chemical reagent which is reactive therewith and which causes cross-linking, the stability of the cellulose derivative is improved for use in the permeation process. When the modification reaction is carried out by contacting a liquid solution of the cellulose derivative with the modifying agent, reaction occurs at random throughout the anhydroglucose units which comprise the cellulose polymer chain. Films cast from such a cross-linked cellulose derivative will contain the introduced modifying agent throughout the thickness of the film. Similarly, when a liquid solution of the modifying agent is allowed to come in contact with a film of the cellulose derivative, cross-linking throughout the thickness of the film occurs. Cross-linking throughout the thickness of the film, while it improves the high temperature stability of the film, also reduces the rate at which the permeation takes place through the film.

By subjecting the film surface of the organic derivative of cellulose to vapors of the cross-linking agent, cross-linking can be substantially limited to occur on the surface of the film rather than throughout the thickness of the film. The film which is so cross-linked provides higher permeation rates when employed as a permeation membrane in a permeation process. Preferably, only one surface or side of the cellulosic film is contacted by vapors of the cross-linking agent, and the surface in contact with the charge mixture to the permeation process is preferably the cross-linked surface.

Various cross-linking agents such as organic diisocyanates, dibasic acid anhydrides, organic dihalides such as organic phosphorous dichlorides, diacyl halides which may be represented as $R(COCl)_2$, etc., may be used. In carrying out the surface modification technique, dried air or other gas is heated, passed into a liquid solution of the cross-linking agent to vaporize the latter, and the gas stream containing vapors of the cross-linking agent is directed at one surface of the film of cellulose derivative. The contacting of the vapors with the film is preferably carried out under conditions such that no cross-linking agent condenses upon the film, otherwise cross-linking through the thickness of the film tends to occur. As an example, when using 2,4-tolylene diisocyanate as the cross-linking agent, a gas such as air or nitrogen is heated to a temperature of about 30° C. to 150° C. and is passed through the liquid diisocyanate. The gas stream containing the diisocyanate vapors is directed into a heated (30° C. to 150° C.) chamber containing the film. The 2,4-tolylene diisocyanate vapors are permitted to contact only one side of the film. The gas stream is saturated with 2,4-tolylene diisocyanate, and the quantity of the latter contacting the film will depend upon the time, temperature and pressure of operation. As larger amounts of the cross-linking agent are contacted with the film, the selectivity continues to improve. Yet the permeation rate of the surface cross-linked film is substantially better than the film cross-linked throughout its thickness.

*Example 17*

A film of ethyl cellulose (G-100), having an average of 0.68 free hydroxyl group per anhydroglucose unit, was suspended in a sealed chamber. The film had a thickness of 0.6 mil. Air was passed through a drying tube containing potassium hydroxide pellets, and then through a heater. Thereafter the dry air was passed into the container to displace any moisture present in the container. Thereafter the heated air was passed through a tube and bubbled through a solution of 2,4-tolylene diisocyanate heated at a constant temperature of 115° C. The air saturated with diisocyanate vapors was then passed through a tube having a nozzle at its end to disperse the gaseous stream into a chamber in which only one surface of the ethyl cellulose film was exposed to the vapors. Heat lamps were positioned in a manner so as to maintain the temperature of the chamber as well as the film surface at approximately 80° C. The film surface was exposed to the atmosphere of air saturated with diisocyanate vapors at 80° C. and atmospheric pressure for a period of approximately 2 hours. Thereafter the film was removed and was employed as a permeation membrane employing the permeation apparatus and techniques described in Example 1, except that the permeation temperature was 100° C. and a 50–50 mixture of methyl cyclohexane-isoctane was used as the charge to the permeation process. An ethyl cellulose (G–100) film of the same thickness was cross-linked throughout its thickness with 2,4-tolylene diisocyanate in the manner described in Example 8, using 0.5 part of the diisocyanate and 10 parts of ethyl cellulose. It was used as a permeation membrane to provide a comparison. The results obtained in the permeation runs follow:

| | Permeation Rate [1] | Percent Methyl-cyclo-hexane in Permeate |
|---|---|---|
| Surface cross-linked ethyl cellulose | 111 | 74 |
| Depth cross-linked ethyl cellulose | 66 | 70 |

[1] Gallons/hour/thousand sq. ft. membrane surface.

The surface modified ethyl cellulose film has good temperature stability, higher selectivity, and a higher permeation rate than does the film which was cross-linked throughout its thickness.

While the invention has been described with reference to certain operating examples, other methods of effecting modification of the organosoluble organic derivative of cellulose by reaction of the hydroxyl groups therein with other modifying agents will be apparent to those skilled in the art.

Thus having described the invention what is claimed is:

1. In a permeation process for separating mixtures of hydrocarbons wherein a fluid feed mixture comprising at least two different hydrocarbons is contacted with one side of a plastic permeation membrane under permeation operating conditions and there is removed from the other side of said membrane a fluid permeate fraction of said fluid feed hydrocarbons having a composition enriched with respect to one hydrocarbon of said fluid feed, the improvement which comprises employing a non-porous permeation membrane which is comprised of a cellulose derivative consisting essentially of cellulose of whose three hydroxyl groups per anhydroglucose units all but 0.1 to 2.0 are replaced by groups selected from the class consisting of ester groups, ether groups, and mixtures thereof, and the remaining 0.1 to 2.0 hydroxyl groups are replaced with organic groups derived from an organic reagent reactive with the remaining hydroxyl groups, which reagent is selected from the group consisting of aldehydes, organic diisocyanate, organic monoisocyanate, organo-phosphorus-chlorides and organo-sulfur-chlorides.

2. The process of claim 1 wherein the permeation membrane is comprised of ethyl cellulose containing an average of from 0.5 to 0.8 free hydroxyl group and from 2.25 to 2.48 ethoxy groups per anhydroglucose unit, which cellulose has been modified by reaction with 2,4-tolylene diisocyanate in an average amount less than 1 mol of said diisocyanate per mol of hydroxyl group contained in the anhydroglucose units of the cellulose to produce a diisocyanate modified ethyl cellulose.

3. The process of claim 1 wherein the permeation membrane is comprised of ethyl cellulose containing an average of from 0.5 to 0.8 free hydroxyl group and from 2.25 to 2.48 ethoxy groups per anhydroglucose unit, which cellulose has been modified by reaction with bi-tolylene diisocyanate in an average amount less than 1 mol of said diisocyanate per mol of hydroxyl group contained in the anhydroglucose units of the cellulose to produce a diisocyanate modified ethyl cellulose.

4. The process of claim 1 wherein the permeation membrane is comprised of cellulose acetate butyrate containing an average of from 0.56 to 1.0 free hydroxyl group, from 0.44 to 0.55 acetyl group and from 1.5 to 1.99 butyryl groups per anhydroglucose unit, which cellulose has been modified by reaction with an aldehyde selected from the group consisting of formaldehyde, paraformaldehyde and 2-ethyl hexaldehyde and which has been reacted in an average amount less than 4 mols of the aldehyde per mol of hydroxyl group to produce an aldehyde modified cellulose acetate butyrate.

5. The process of claim 1 in which the permeation membrane is comprised of ethyl cellulose containing an average of 0.5 to 0.8 free hydroxyl group and from 2.25 to 2.48 ethoxy groups per anhydroglucose unit which has been modified by reaction with 2,4-tolylene diisocyanate and an average amount of 0.167 mol of said diisocyanate per mol of hydroxyl groups contained in the anhydroglucose units of ethyl cellulose to produce a diisocyanate modified ethyl cellulose, and thereafter further modifying said diisocyanate modified ethyl cellulose by reacting it with from 0.28 to 0.5 mol of an aldehyde per mol of said free hydroxyl groups.

6. The process of claim 1 wherein the permeation membrane is comprised of cellulose acetate-butyrate containing 1.0 free hydroxyl group, 0.5 acetyl group and 1.5 butyryl group per anhydroglucose unit which has been modified by reacting therewith 1.46 mols 2-ethylhexaldehyde per mol of said free hydroxyl group to produce an aldehyde-modified cellulose acetate-butyrate, and further modifying the aldehyde-modified cellulose acetate-butyrate by reaction thereof with 2,4-tolylene diisocyanate.

7. The process of claim 1 wherein the cellulose derivative after modification by reaction with the organic reagent and while dissolved in a solvent, is commingled with an aqueous solution in an amount sufficient to cause precipitation of only a portion of the modified cellulose derivative, and the permeation membrane is formed from the modified cellulose derivative which has not precipitated.

8. In a permeation process for separating mixtures of hydrocarbons wherein fluid feed mixture comprising at least two different hydrocarbons is contacted with one side of a plastic ethyl cellulose permeation membrane under permeation operating conditions and there is removed from the opposite side of said membrane a permeate fluid fraction of said hydrocarbon feed having a composition enriched with respect to one of said hydrocarbons of said feed mixture, the improvement which comprises first forming a non-porous ethyl cellulose permeation membrane which is comprised of ethyl cellulose which contains 0.4 to 1.0 free hydroxyl group attached to the anhydroglucose units of said ethyl cellulose, then treating one only side of the ethyl cellulose permeation membrane with vapors of 2,4-tolylene diisocyanate, and thereafter employing said treated membrane in said permeation process wherein the surface is contacted with said treated fluid feed mixture of hydrocarbons.

9. In a permeation process for separating mixtures of hydrocarbons wherein a fluid feed mixture comprising at least two different hydrocarbons is contacted with one side of a plastic permeation membrane under permeation operating conditions and there is removed from the opposite side of said membrane a permeate fluid having a composition enriched with respect to one of the hydrocarbons of said feed, the improvement which comprises employing a membrane which is comprised of a cellulose derivative consisting essentially of cellulose whose three hydroxyl groups attached to the anhydroglucose units all but 0.1 to 2.0 of which are replaced by groups selected from the class consisting of ester groups, ether groups and mixtures thereof and the remaining 0.1 to 2.0 hydroxyl groups are replaced by organic groups other than said ester and ether groups by reaction with an organic reagent reactive with the hydroxyl groups.

10. The process of claim 9 wherein the organic reagent is an aldehyde of from 1 to 12 carbon atoms.

11. The process of claim 9 wherein the organic reagent is an organic diisocyanate whose organic portion is hydrocarbon of from 4 to 16 carbon atoms.

12. The process of claim 9 wherein the organic reagent is an organic monoisocyanate whose organic portion is hydrocarbon of from 2 to 16 carbon atoms.

13. The process of claim 9 wherein the organic reagent is an organic halide selected from the class consisting of organo-phosphorus-chloride and organo-sulfur-chloride wherein the organo portion is hydrocarbon of from 2 to 10 carbon atoms.

14. In a permeation process for separating mixtures of organic chemical compounds wherein a fluid feed mixture comprising at least two different organic compounds is contacted with one side of a plastic permeation membrane under permeation operating conditions and there is removed from the opposite side of said membrane a fluid permeate fraction of said feed having a composition enriched with respect to one of said organic chemical compounds of the fluid feed, the improvement which comprises employing a permeation membrane consisting essentially of cellulose of whose three hydroxyl groups attached to the anhydroglucose unit all but 0.1 to 2.0 are replaced by groups selected from the class consisting of ester groups, ether groups and mixtures thereof the remaining 0.1 to 2.0 hydroxyl groups are replaced by organic groups other than said ester and said ether groups.

References Cited in the file of this patent
UNITED STATES PATENTS

| | | |
|---|---|---|
| 2,159,014 | Dreyfus | May 23, 1939 |
| 2,159,434 | Frey | May 23, 1939 |
| 2,339,912 | Goffman | Jan. 25, 1944 |
| 2,386,826 | Wallach et al. | Oct. 16, 1945 |
| 2,436,076 | Pfeffer | Feb. 17, 1948 |
| 2,475,990 | Robertson | July 12, 1949 |
| 2,502,841 | Henderson | Apr. 4, 1950 |
| 2,871,695 | Goetz | Feb. 3, 1959 |
| 2,930,754 | Stuckey | Mar. 29, 1960 |
| 2,958,656 | Stuckey | Nov. 1, 1960 |

UNITED STATES PATENT OFFICE
CERTIFICATE OF CORRECTION

Patent No. 3,140,256 July 7, 1964

Eugene C. Martin et al.

It is hereby certified that error appears in the above numbered patent requiring correction and that the said Letters Patent should read as corrected below.

Column 24, line 62, before "surface" insert -- treated --; line 63, strike out "treated".

Signed and sealed this 10th day of November 1964.

(SEAL)
Attest:

ERNEST W. SWIDER
Attesting Officer

EDWARD J. BRENNER
Commissioner of Patents